Aug. 29, 1933.  S. M. BÄCKSTRÖM  1,924,770
ABSORPTION REFRIGERATING SYSTEM
Filed Oct. 20, 1931
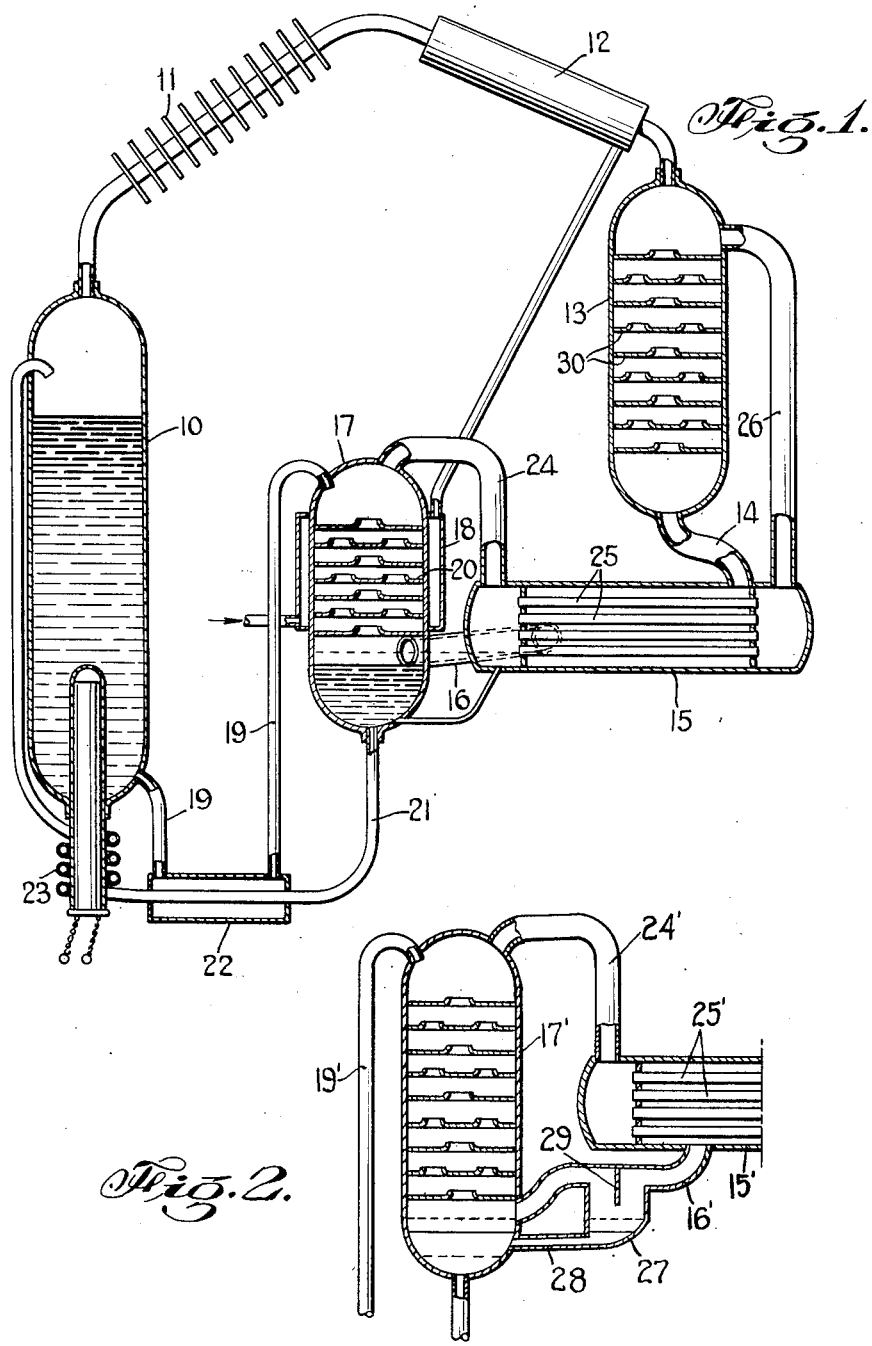
INVENTOR
S. M. Bäckström
BY
ATTORNEY

UNITED STATES PATENT OFFICE 1,924,770

ABSORPTION REFRIGERATING SYSTEM

Sigurd Mattias Bäckström, Stockholm, Sweden, assignor, by mesne assignments, to Electrolux Servel Corporation, New York, N. Y., a corporation of Delaware Application October 20, 1931, Serial No. 569,917, and in Germany January 20, 1931

5 Claims. (Cl. 62—119.5)

This invention relates to absorption refrigerating systems and more particularly to such systems of the pressure equalized type in which an inert pressure equalizing gas such as hydrogen circulates between the evaporator and absorber.

In order to obtain good efficiency in refrigerating systems of this type the circulation of absorption liquid, the circulation of refrigerant, and the circulation of pressure equalizing gas should have a definite relationship. This relationship is determined for a certain normal operating condition at which the evaporator absorbs a predetermined amount of heat from the surrounding medium, that is, effects a certain amount of refrigeration. If for some reason the refrigerating effect of the evaporator varies, losses causing a decrease in efficiency will occur if the rate of circulation of the pressure equalizing gas or the absorption liquid or both do not change correspondingly.

According to this invention the efficiency of absorption refrigerating systems of the pressure equalized type is maintained during abnormal refrigerating conditions by varying the flow resistance in the auxiliary gas circuit responsive to a control factor in the system whereby the rate of circulation of the auxiliary gas is controlled to correspond to the refrigerating effect.

This invention will be more fully understood by reference to the following description taken in connection with the accompanying drawing in which Fig. 1 shows an absorption refrigerating system of the pressure equalized type which is operated in accordance with this invention; and Fig. 2 shows a modification applicable to the system shown in Fig. 1.

Referring to Fig. 1 of the drawing which shows a well known absorption refrigerating system of the pressure equalized type, a generator 10 contains a solution of refrigerant, such as ammonia, in an absorption liquid such as water. Refrigerant gas expelled from solution in the generator by heat passes through rectifier 11, where absorption liquid vapor is separated from the refrigerant gas, into condenser 12 where the refrigerant gas under generator pressure is liquefied by the transfer of heat to cooling water flowing in the condenser jacket. Liquid refrigerant flows from the condenser into an evaporator 13, flowing downwardly over disks 30 and evaporating into an inert pressure equalizing gas such as hydrogen, which enters the upper part of the evaporator through conduit 26. The resulting gas mixture being heavier than the inert gas flows from the bottom of the evaporator through conduit 14 into a gas heat exchanger 15 from where it flows into the lower part of absorber 17 through conduit 16.

Weak absorption liquid from the lower part of the generator flows through conduit 19 and liquid heat exchanger 22 into the upper part of absorber 17, flowing downwardly over disks 20 and absorbing refrigerant gas out of the gas mixture. Enriched absorption liquid flows from the bottom of absorber 17 through conduit 21, liquid heat exchanger 22, and thermo-syphon pump 23 back to the generator 10 while the inert gas returns from absorber 17 through conduit 24, gas heat exchanger 15, and conduit 26 back to the evaporator 13.

Assume the apparatus is so dimensioned and supplied with such a charge that all the refrigerant expelled from solution in the generator and liquefied in the condenser is evaporated into the gas in the evaporator and that conduit 16 between the gas heat exchanger 15 and absorber 17 is fully open. The refrigerating effect of the evaporator can now be decreased by reducing the amount of heat supplied to the generator which results in less refrigerant being expelled from solution, whereupon the quantity of fluid in the form of liquid in the system is increased, as less of the refrigerant is in the form of vapor.

The level of liquid in the generator and absorber must therefore rise and as the level of the liquid in the absorber rises past the opening of pipe 16 the effective flow area of this conduit is decreased so that the circulating auxiliary gas is subjected to a greater flow resistance whereby the rate of circulation is decreased. This is desirable in the operation of the system since upon decreased circulation of refrigerant the auxiliary gas circulation should be also correspondingly less in order that the efficiency is not impaired.

In Fig. 2 there is shown a modification with the parts corresponding to those in Fig. 1 correspondingly indicated. In this arrangement the conduit 16' which conducts the gas mixture from the gas heat exchanger 15' to the absorber 17' is provided with an offset chamber 27 which is connected to the lower part of the absorber 17' through conduit 28. A baffle 29 is located across conduit 16' and extends into chamber 27.

When the liquid level in the absorber rises as described in connection with Fig. 1 the liquid level in chamber 27 also rises and since the gas flowing through conduit 16 must pass around the baffle 29 through chamber 27 the effective flow area for the gas is decreased considerably even though the variation of liquid level in the absorber is only slight. This embodiment presents certain advantages when the absorber liquid level is slightly increased by the addition of unevaporated liquid refrigerant which flows from the evaporator through the gas heat exchanger 15', conduit 16', chamber 27, and conduit 28 into the absorber.

It will be obvious to those skilled in the art that various changes may be made in the construction and arrangement without departing from the spirit of the invention and therefore the invention is not limited to what is described in the specification and shown in the drawing but only as indicated in the appended claims.

I claim:

1. Absorption refrigerating systems in which circulates an auxiliary pressure equalizing gas including a conduit for gas from the evaporator to the absorber, a chamber extending downwardly from a portion of said conduit, a baffle across said conduit and extending downwardly into said chamber, and a connection from the lower part of the absorber to the lower part of said chamber such that absorption liquid stands in said chamber at the same level as in the absorber.

2. Absorption refrigerating systems in which circulates an auxiliary pressure equalizing gas including a conduit for gas having a U-shaped section between the evaporator and absorber, and a connection from the lower part of the absorber to the lower part of said U-shaped section, the latter being located such that absorption liquid stands in the lower portion thereof at the same level as in the absorber.

3. In absorption refrigerating systems in which circulates an auxiliary pressure equalizing gas a U-shaped chamber in the conduit for gas from the evaporator to the absorber, and a connection from the lower part of the absorber to the lower part of said chamber such that absorption liquid stands in the latter at the same level as in the absorber.

4. In an absorption refrigerating system having an absorber and an evaporator interconnected for the circulation of inert gas, a conduit for gas connected to said absorber above the liquid level therein and having a portion extending downwardly below the liquid level, and a connection for liquid from the absorber to said portion of the gas conduit such that absorption liquid stands in said portion at the same level as in the absorber.

5. In an absorption refrigerating system having an absorber and an evaporator interconnected for the circulation of inert gas, means forming a chamber extending above and below the normal liquid level in the absorber and forming a portion of a conduit for gas connected to the absorber above the liquid level therein, and a connection from the lower part of said chamber to the absorber below the liquid level therein.

SIGURD MATTIAS BÄCKSTRÖM.